United States Patent
Reutler et al.

(10) Patent No.: US 8,420,207 B2
(45) Date of Patent: Apr. 16, 2013

(54) SUBSTRATE COMPRISING A STACK HAVING THERMAL PROPERTIES

(75) Inventors: Pascal Reutler, Paris (FR); Nicolas Nadaud, Paris (FR); Estelle Martin, Saint-Denis (FR); Laurent Labrousse, Salaise (FR)

(73) Assignee: Sanit-Gobain Glass France, Courbevoie (FR)

( * ) Notice: Subject to any disclaimer, the term of this patent is extended or adjusted under 35 U.S.C. 154(b) by 0 days.

(21) Appl. No.: 12/281,774

(22) PCT Filed: Mar. 6, 2007

(86) PCT No.: PCT/FR2007/050881
§ 371 (c)(1),
(2), (4) Date: Jan. 13, 2009

(87) PCT Pub. No.: WO2007/101963
PCT Pub. Date: Sep. 13, 2007

(65) Prior Publication Data
US 2009/0130409 A1 May 21, 2009

(30) Foreign Application Priority Data
Mar. 6, 2006 (FR) ...................... 06 50770

(51) Int. Cl.
*B32B 17/06* (2006.01)
*C23C 14/34* (2006.01)
*C23C 14/35* (2006.01)

(52) U.S. Cl.
USPC .... 428/216; 428/213; 204/192.1; 204/192.12

(58) Field of Classification Search .................. 428/213, 428/216; 204/192.1, 192.12
See application file for complete search history.

(56) References Cited

U.S. PATENT DOCUMENTS 4,985,312 A 1/1991 Furuya et al.
(Continued)

FOREIGN PATENT DOCUMENTS

EP 0 995 725 A1 4/2000
WO WO 2005/051858 A1 6/2005

OTHER PUBLICATIONS

U.S. Appl. No. 12/933,240, filed Sep. 17, 2010, Reutler, et al.
(Continued)

*Primary Examiner* — Maria Veronica Ewald
*Assistant Examiner* — Tahseen N Khan
(74) *Attorney, Agent, or Firm* — Oblon, Spivak, McClelland, Maier & Neustadt, L.L.P.

(57) ABSTRACT

The invention relates to a substrate (10), provided with a thin-film multilayer comprising an alternation of n functional layers (40, 80) having reflection properties in the infrared and/or in solar radiation and (n+1) coatings (20, 60, 100), where n is an integer $\geq 2$, said coatings being composed of a plurality of dielectric layers (24, 26; 64, 66; 104), so that each functional layer (40, 80) is placed between two coatings (20, 60, 100), at least two functional layers (40, 80) each being deposited on a wetting layer (30, 70) itself deposited respectively directly onto a subjacent coating (20, 60), characterized in that two subjacent coatings (20, 60) each comprise at least one dielectric layer (24, 64) and at least one noncrystalline smoothing layer (26, 66) made from a material that is different from the material of said dielectric layer within each coating, said smoothing layer (26, 66) being in contact with said superjacent wetting layer (30, 70) and in that these two subjacent coatings (20, 60) being of different thicknesses, the thickness of the smoothing layer (26, 66) of the subjacent coating (20, 60) that has a total thickness of less than that of the other subjacent coating (60, 20) is less than or equal to the thickness of the smoothing layer (66, 26) of this other subjacent coating (60, 20).

18 Claims, 6 Drawing Sheets

U.S. PATENT DOCUMENTS

| | | |
|---|---|---|
| 5,993,950 A | 11/1999 | Novis et al. |
| 2003/0099842 A1 | 5/2003 | Za-Gdoun et al. |
| 2004/0241406 A1* | 12/2004 | Nadaud et al. ................ 428/212 |

OTHER PUBLICATIONS

U.S. Appl. No. 13/347,912, filed Jan. 11, 2012, Martin, et al.
U.S. Appl. No. 13/496,090, filed Mar. 14, 2012, Kharchenko, et al.

* cited by examiner

SUBSTRATE COMPRISING A STACK HAVING THERMAL PROPERTIES

The present application is the U.S. counterpart of WO 07/101,963, the text of which is incorporated by reference, and claims the priority of French Application No. 06/50770, filed on Mar. 6, 2006, the text of which is incorporated by reference.

The invention relates to transparent substrates, especially those made of rigid mineral material such as glass, said substrates being coated with a thin-film multilayer comprising at least two functional layers of metallic type which can act on solar radiation and/or infrared radiation of long wavelength.

The invention relates more particularly to the use of such substrates for manufacturing thermal insulation and/or solar protection glazing. These glazing may be intended for equipping both buildings and vehicles, especially with a view to reducing air-conditioning load and/or preventing excessive overheating (glazing called "solar control" glazing) and/or reducing the amount of energy dissipated to the outside (glazing called "low-e" or "low-emissivity" glazing) brought about by the ever growing use of glazed surfaces in buildings and vehicle passenger compartments.

These glazing may furthermore be integrated into glazing units having particular functionalities, such as, for example, heated windows or electrochromic glazing.

One type of multilayer known for giving substrates such properties is composed of at least two metallic functional layers having reflection properties in the infrared and/or in solar radiation, especially metallic functional layers based on silver or on a metal alloy containing silver.

Each metallic functional layer is deposited in a crystalline form on a wetting layer that is also crystalline and that promotes the suitable crystalline orientation of the metallic layer deposited on it.

Each functional layer is placed between two coatings made of dielectric material of the metal oxide or nitride type. This multilayer is generally obtained by a succession of deposition operations carried out using a vacuum technique, such as sputtering, optionally magnetically enhanced or magnetron sputtering. One, or even two, very thin film(s), known as "blocking coatings", may also be provided, this or these being placed directly under, over or on each side of each silver-based metallic functional layer—the subjacent coating as a tie, nucleation and/or protection coating, for protection during a possible heat treatment subsequent to the deposition, and the superjacent coating as a "sacrificial" or protection coating so as to prevent the silver from being impaired if a layer that surmounts is deposited by sputtering in the presence of oxygen or nitrogen and/or if the multilayer undergoes a heat treatment subsequent to the deposition.

Thus, multilayers of this type, with two silver-based layers, are known from European patent EP-0 638 528.

Furthermore, the use of an amorphous layer based on a mixed zinc and tin oxide, which is directly in contact with the substrate, under a wetting layer based on zinc oxide is known from European patent application No. EP 803 481.

It turns out that when such an amorphous layer is not deposited directly onto the substrate but is inserted between a subjacent dielectric layer and a wetting layer, it makes it possible to modify the interface between the dielectric layer and the wetting layer located above and thus to significantly improve the crystallization of the wetting layer and also the crystallization of the metallic functional layer.

However, the integration of such an amorphous layer in each subjacent coating having a functional layer and provided with at least one dielectric layer under this amorphous layer in a multilayer having several functional layers makes it impossible to achieve, in every case, the desired improvement in the crystallization of the functional layers and thus the desired improvement in the resistivity of the entire multilayer.

The object of the invention is therefore to remedy the drawbacks of the prior art, by developing a novel type of multilayer having functional layers of the type of those described above, which multilayer has an improved resistivity, lower than in a similar multilayer having equivalent thicknesses of functional layers and coatings. Said multilayer may or may not undergo one (or more) high-temperature heat treatment(s) of the bending, toughening or annealing type, but if it does undergo one (or more) such treatment(s), its optical quality and mechanical integrity will be preserved.

Thus, the subject of the invention, in its broadest acceptance, is a substrate, especially a transparent glass substrate, provided with a thin-film multilayer comprising an alternation of n functional layers having reflection properties in the infrared and/or in solar radiation, especially metallic functional layers based on silver or on a metal alloy containing silver, and (n+1) coatings, where n is an integer $\geq 2$, said coatings being composed of a plurality of dielectric layers, so that each functional layer is placed between two coatings, at least two functional layers each being deposited on a wetting layer itself deposited respectively directly onto a subjacent coating, characterized in that two subjacent coatings each comprise at least one dielectric layer and at least one noncrystalline smoothing layer made from a material that is different from the material of said dielectric layer within each coating, said smoothing layer being in contact with said superjacent wetting layer and in that these two subjacent coatings being of different thicknesses, the thickness of the smoothing layer of the subjacent coating that has a total thickness of less than that of the other subjacent coating is less than or equal to the thickness of the smoothing layer of this other subjacent coating.

Thus, the invention consists in providing a noncrystalline smoothing layer under the wetting layer which is crystalline in order to allow suitable growth of the functional layer located on top of this wetting layer, which smoothing layer is in contact with the wetting layer directly or via an underblocking coating.

The crystallographic appearance of the smoothing layer is inevitably different from that of the wetting layer since the smoothing layer is noncrystalline whereas the wetting layer is, for the most part, crystalline; they can therefore not be confused from this point of view.

However, it has emerged that in multilayers having several functional layers, it is important to take into account the thickness of the subjacent coatings in order to calculate the thickness of the smoothing layers present in these subjacent coatings.

Thus, the invention consists in providing that the thickness of the smoothing layer of a less thick subjacent coating cannot be greater than the thickness of the smoothing layer of a thicker subjacent coating.

The invention applies to coatings that are subjacent to a functional layer, regardless of the location of the functional layers in the multilayer; however, it is preferable that in one and the same thin-film multilayer, all the subjacent coatings comprising a smoothing layer match the definition of the invention.

Within the meaning of the present invention, when it is stated that a deposition of a layer or a coating (comprising one or more layers) is carried out directly under or directly on another deposit, it means that no other layer can be interposed between these two deposits.

The smoothing layers are preferably oxide-based; they are therefore not metallic.

The smoothing layers are said to be "noncrystalline" in the sense that they can be completely amorphous or partially amorphous, and thus partially crystalline, but they cannot be completely crystalline over their entire thickness.

The advantage of such a smoothing layer is to make it possible to obtain an interface with the directly superjacent wetting layer that is not very rough. This low roughness can furthermore be seen with a transmission electron microscope.

Furthermore, the wetting layer has a better texture and, in addition, has a preferential crystallographic orientation that is more pronounced.

Each smoothing layer is thus made of a different material, differing both from a crystallographic and stoichiometric point of view, from that of the wetting layer under which it is directly placed.

The invention does not solely apply to multilayers that only comprise two "functional" layers, placed between three coatings, two of which are subjacent coatings. It also applies to multilayers comprising three functional layers alternating with four coatings, three of which are subjacent coatings, or four functional layers alternating with five coatings, four of which are subjacent coatings.

For these multilayers having multiple functional layers, at least one functional layer, and preferably each functional layer, is placed directly onto at least one subjacent blocking coating and/or directly under at least one superjacent blocking coating.

In the case of multilayers having two functional layers, even in other cases also, the thinner coating of said two subjacent coatings comprising a smoothing layer is, preferably, the one closest to the substrate, even in contact with the substrate, directly or indirectly via a contact layer, for example based on titanium oxide ($TiO_2$).

In the case of multilayers having more than two functional layers, the subjacent coating furthest from the substrate is the thinner of two adjacent subjacent coatings.

Preferably, at least one smoothing layer, even all the smoothing layers, is (or are) an oxide layer, and especially a mixed oxide layer based on an oxide of one or more of the following metals: Sn, Si, Ti, Zr, Hf, Zn, Ga, In and more precisely a layer of a mixed oxide based on zinc and tin or a layer of a mixed indium tin oxide (ITO) deposited at low temperature.

The index of the smoothing layer is, preferably, less than 2.2.

Preferably, in addition, at least one smoothing layer, even all the smoothing layers, is (or are) an oxide layer having a nonstoichiometric amount of oxygen and even more particularly a substoichiometric mixed oxide layer based on zinc and tin, doped with antimony ($SnZnO_x$:Sb, x being a number).

Furthermore, the (or each) smoothing layer preferably has a geometric thickness between 0.1 and 30 nm and more preferably between 0.2 and 10 nm, in particular for the thinner of the two involved.

In a preferred variant, at least one blocking coating is based on Ni or on Ti or is based on an Ni-based alloy, and especially is based on an NiCr alloy.

In addition, at least one, and preferably each, wetting layer subjacent to a functional layer is, preferably, based on zinc oxide; these wetting layers may be, in particular, based on zinc oxide aluminum-doped.

The geometric thickness of each wetting layer is preferably between 2 and 30 nm and more preferably between 3 and 20 nm.

Moreover, at least one, and preferably each, dielectric layer adjacent to a smoothing layer within said subjacent coatings and in particular the dielectric layer directly subjacent to the smoothing layer, is, preferably, based on nitride, especially on silicon nitride and/or aluminum nitride.

The index of this nitride-based dielectric layer is, preferably, less than 2.2.

The glazing according to the invention incorporates at least the substrate carrying the multilayer according to the invention, optionally combined with at least one other substrate. Each substrate may be clear or tinted. At least one of the substrates may especially be made of bulk-tinted glass. The choice of coloration type wilt depend on the level of light transmission and/or on the colorimetric appearance that is desired for the glazing once its manufacture has been completed.

Thus, for glazing intended to equip vehicles, some standards dictate that windshields should have a light transmission $T_L$ of about 75%, while other standards impose a light transmission $T_L$ of about 65%; such a level of transmission is not required for the side windows or the sunroof for example. The tinted glass that can be used is for example that which, for a thickness of 4 mm, has a $T_L$ of 65% to 95%, an energy transmission $T_E$ of 40% to 80%, a dominant wavelength in transmission of 470 nm to 525 nm, associated with a transmission purity of 0.4% to 6% under illuminant $D_{65}$, which may "result" in the (L, a*, b*) colorimetry system, in a* and b* values in transmission of between −9 and 0 and between −8 and +2 respectively.

For glazing intended to equip buildings, the glazing preferably has a light transmission $T_L$ of at least 75% or higher in the case of "low-emissivity" applications, and a light transmission $T_L$ of at least 40% or higher for "solar control" applications.

The glazing according to the invention may have a laminated structure, especially one combining at least two rigid substrate of the glass type with at least one sheet of thermoplastic polymer, so as to have a structure of the type: glass/thin-film multilayer/sheet(s)/glass. The polymer may especially be based on polyvinyl butyral (PVB), ethylene/vinyl acetate (EVA), polyethylene terephthalate (PET) or polyvinyl chloride (PVC).

The glazing may also have what is called an asymmetric laminated glazing structure, which combines a rigid substrate of the glass type with at least one sheet of polymer of the polyurethane type having energy-absorbing properties, optionally combined with another layer of polymers having "self-healing" properties. For further details about this type of glazing, the reader may refer especially to patents EP-0 132 198, EP-0 131 523, EP-0 389 354.

The glazing may therefore have a structure of the type: glass/thin-film multilayer/polymer sheet(s).

The glazing according to the invention is capable of undergoing a heat treatment without damaging the thin-film multilayer. The glazing is therefore possibly curved and/or toughened.

The glazing may be curved and/or toughened when consisting of a single substrate, that provided with the multilayer. It is then referred to as "monolithic" glazing. When the glazing is curved, especially for the purpose of making windows for vehicles, the thin-film multilayer is preferably on an at least partly nonplanar face.

The glazing may also be a multiple glazing unit, especially a double-glazing unit, at least the substrate carrying the multilayer being curved and/or toughened. It is preferable in a multiple glazing configuration for the multilayer to be placed so as to face the intermediate gas-filled space. In a laminated structure, the substrate carrying the multilayer is preferably in contact with the sheet of polymer.

When the glazing is monolithic or is in the form of multiple glazing of the double-glazing or laminated glazing type, at least the substrate carrying the multilayer may be made of curved or toughened glass, it being possible for this substrate to be curved or toughened before or after the multilayer has been deposited.

In one variant, the glazing is provided with means that enable said multilayer to be supplied with electric power.

The invention also relates to a process for manufacturing substrates according to the invention, which consists in depositing the thin-film multilayer on its substrate by a vacuum technique of the sputtering, optionally magnetically enhanced sputtering, type and then in carrying out a heat treatment of the bending, toughening or annealing type on the coated substrate without degrading its optical and/or mechanical quality.

However, it is not excluded for the first layer or first layers of the multilayer to be able to be deposited by another technique, for example by a thermal decomposition technique of the pyrolysis type.

The details and advantageous features of the invention will become apparent from the following nonlimiting examples, illustrated by means of the attached figures.

In the figures illustrating the multilayers, the thicknesses of the various materials have not been drawn strictly to scale in order to make them easier to understand.

Furthermore, in all the examples below the thin-film multilayer is deposited on a substrate 10 made of soda-lime glass having a thickness of 2 mm, unless explicitly mentioned otherwise.

In each case where a heat treatment was applied to the substrate, this was an annealing treatment for around 5 minutes at a temperature of around 660° C. followed by cooling in ambient air (around 20° C.).

The objective of FIGS. 1 to 4 is to illustrate the importance of the presence of a smoothing layer in a multilayer.

Figure 1:
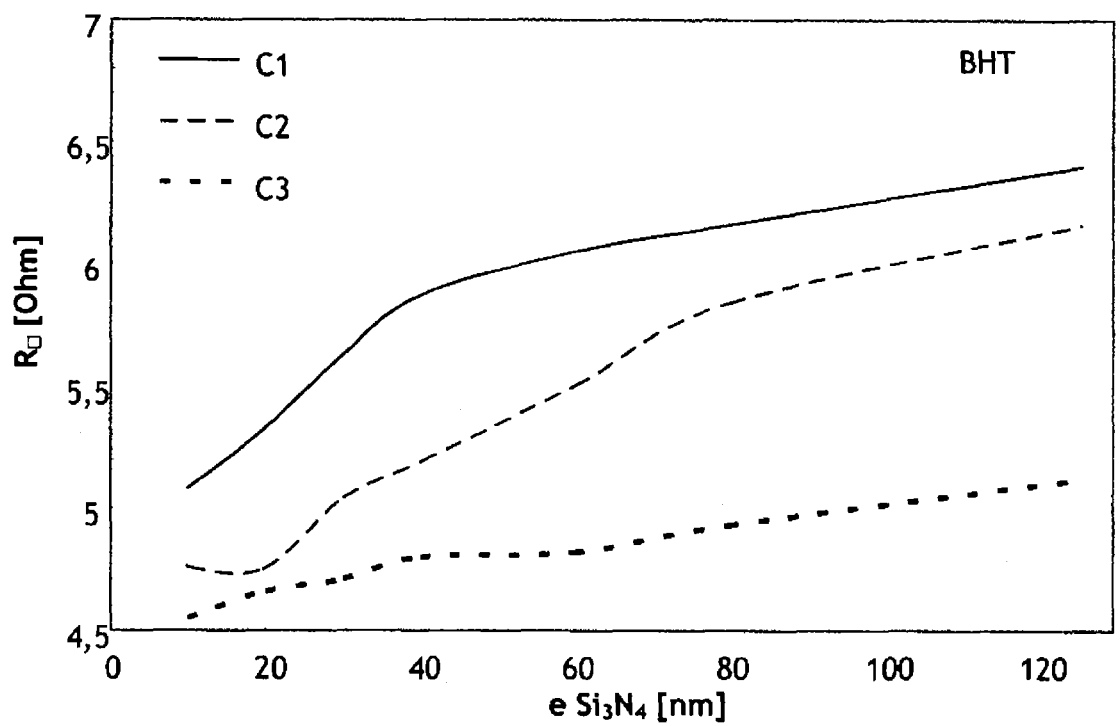
FIG. 1 illustrates the change, before heat treatment, in the sheet resistance of a multilayer having a single functional layer provided with a coating having a single overblocking layer, with and without a smoothing layer, as a function of the thickness of the dielectric layer placed underneath.
Figure 2:
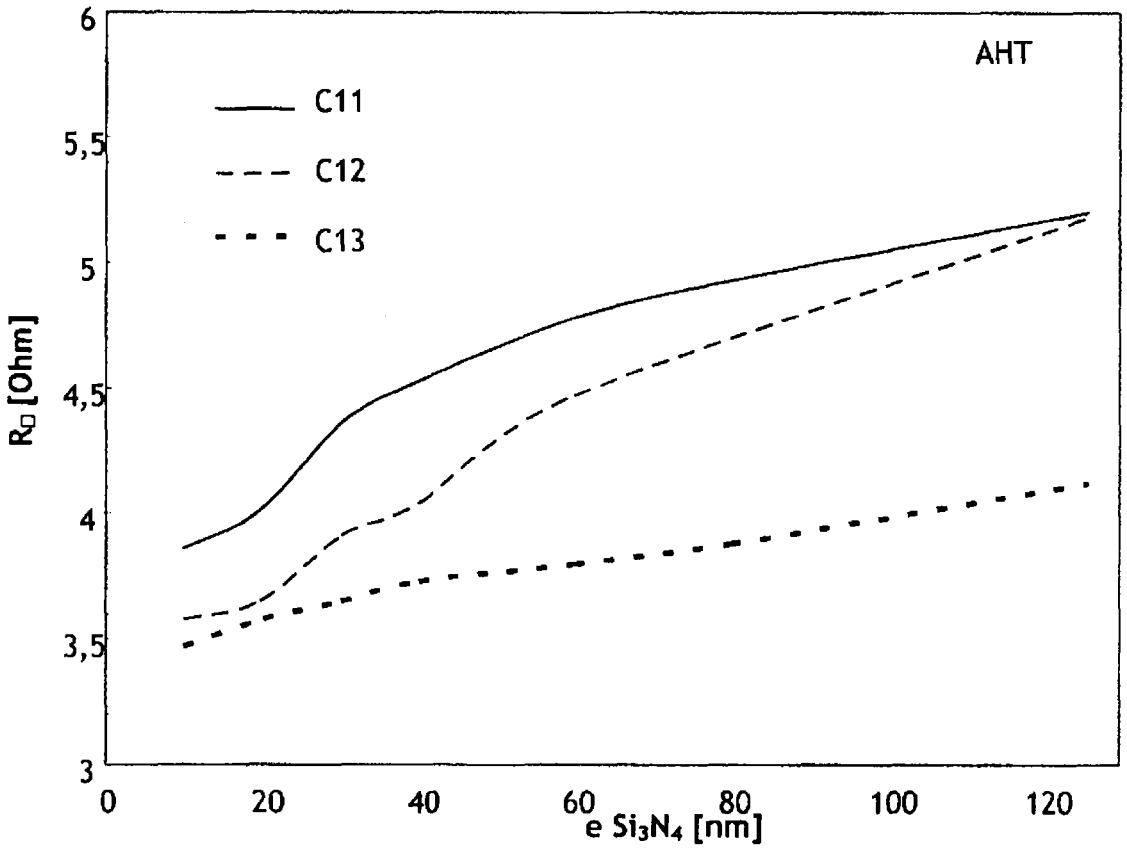
FIG. 2 illustrates the change, after heat treatment, in the sheet resistance of the same multilayer having a single functional layer as in FIG. 1, with and without a smoothing layer, as a function of the thickness of the dielectric layer placed underneath.

However, the multilayer which has been used to produce these figures is not a multilayer according to the invention because it is a multilayer having a single functional layer of the type:

Substrate/$Si_3N_4$/$SnZnO_x$:Sb/ZnO/Ag/Ti/ZnO/$Si_3N_4$
Variable/Variable/8 nm/10 nm/2 nm/8 nm/20 nm In FIGS. 1 and 2, the curves C1 and C11 illustrate the change in the sheet resistance (in ohms) of the multilayer as a function of the thickness of the dielectric layer based on silicon nitride (e $Si_3N_4$) in contact with the substrate, before (BHT) and after (AHT) heat treatment respectively, when the multilayer is not provided with a smoothing layer.

The curves C2 and C12 illustrate the change in the sheet resistance (in ohms) of the multilayer as a function of the thickness of the dielectric layer based on silicon nitride (e $Si_3N_4$) in contact with the substrate, before and after heat treatment respectively, when the multilayer is provided with a smoothing layer made from $SnZnO_x$:Sb having a thickness of 6 nm (x denotes a non-zero number).

The curves C3 and C13 illustrate the change in the sheet resistance (in ohms) of the multilayer as a function of the thickness of the dielectric layer based on silicon nitride (e $Si_3N_4$) in contact with the substrate, before and after heat treatment respectively, when the multilayer is provided with a smoothing layer based on $SnZnO_x$:Sb having a thickness of 20 nm.

As can be seen in these FIGS. 1 and 2, for the same thickness of dielectric layer in contact with the substrate (for example 20 nm), the sheet resistance of the multilayer is always lower—therefore better—for curves C2, C3, C12 and C13 when the multilayer comprises a smoothing layer based on $SnZnO_x$:Sb between the dielectric layer based on silicon nitride in contact with the substrate and the wetting layer based on zinc oxide ZnO subjacent to the functional layer based on silver Ag; furthermore, the sheet resistance of the multilayer is always lower for a smoothing layer thickness of 20 nm (curves C3 and C13).

It was verified that the smoothing layer made from a mixed oxide is amorphous throughout its thickness, whereas the wetting layer and the metallic functional layer are both crystalline, throughout their thickness.

Consequently, the presence of a smoothing layer significantly improves the sheet resistance of the multilayer for comparable thickness of the subjacent dielectric layer, and this improvement is even greater when the thickness of the smoothing layer is large.

Figure 3:
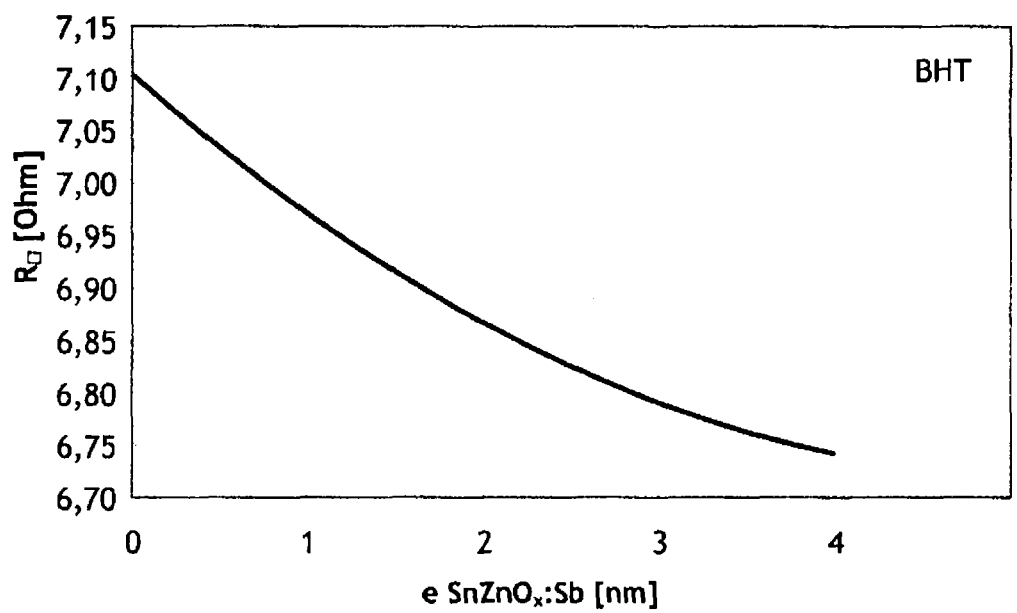
FIG. 3 illustrates the change, before heat treatment, in the sheet resistance of a multilayer having a single functional layer provided with a coating having a single overblocking layer as a function of the thickness of the smoothing layer.
Figure 4:
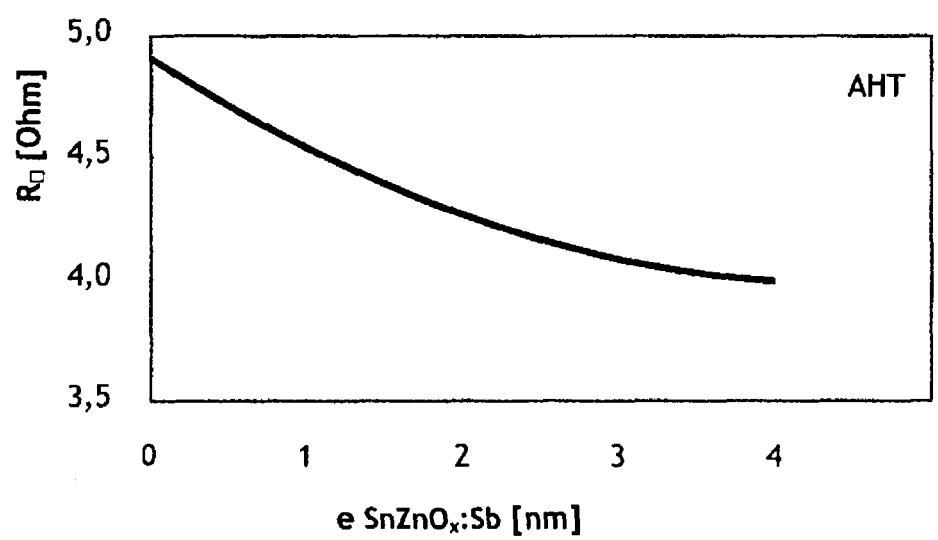
FIG. 4 illustrates the change, after heat treatment, in the sheet resistance of the same multilayer having a single functional layer as in FIG. 3, as a function of the thickness of the smoothing layer.

In FIGS. 3 and 4, the curves illustrate the change in the sheet resistance (in ohms) of the multilayer as a function of the thickness of the smoothing layer based on zinc and tin oxide doped with antimony (e $SnZnO_x$:Sb), before (BHT) and after (AHT) heat treatment respectively, when the multilayer is provided with a 20 nm layer based on silicon nitride $Si_3N_4$ between the substrate and the layer based on $SnZnO_x$:Sb.

It was also verified that the smoothing layer made from a mixed oxide is amorphous throughout its thickness, whereas the wetting layer and the metallic functional layer are both crystalline, throughout their thickness.

As can be seen in these FIGS. 3 and 4 also, the presence of a smoothing layer significantly improves the sheet resistance of the multilayer for a smoothing layer with a thickness between >0 and 4 nm, and this improvement is even greater when the thickness of the smoothing layer is large.

Similar observations may be made with a multilayer having a single functional layer provided with an underblocking coating and without an overblocking coating or provided with an underblocking coating and with an overblocking coating.

In addition, tests were conducted in order to measure the roughness of the layers.

Table 1 below illustrates the roughness measured by X-ray reflectometry and expressed in nm (the roughness of the substrate being around 0.4):

TABLE 1

| Layer(s) | Thickness (nm) | Roughness σ (nm) |
| --- | --- | --- |
| $Si_3N_4$ | 28.5 | 1.1 |
| Glass | Substrate | |
| $SnO_2$ | 29.5 | 0.8 |
| Glass | Substrate | |
| $SnZnO_x$:Sb | 32.0 | 0.7 |
| Glass | Substrate | |
| $SnZnO_x$:Sb | 11.2 | 0.8 |
| $Si_3N_4$ | 19.7 | 0.5 |
| Glass | Substrate | |
| $SnO_2$ | 10.4 | 0.8 |
| $Si_3N_4$ | 19.3 | 0.5 |
| Glass | Substrate | |

As can be seen in this table, the roughness of the layer based on silicon nitride $Si_3N_4$ deposited alone on the glass is high, but the final roughness of a multilayer comprising a layer of a mixed oxide based on indium tin oxide $SnInO_x$ (ITO) or a layer based on a mixed zinc tin oxide $SnZnO_x$:Sb deposited on the layer based on silicon nitride is lower. The wetting layer based on a mixed oxide thus makes it possible to improve the roughness of the interface with the wetting layer, by reducing this roughness.

Starting from these observations, it is thus possible to deposit, on a substrate 10, a thin-film multilayer comprising an alternation of n functional layers 40, 80, 120, 160 having reflection properties in the infrared and/or in solar radiation, especially metallic functional layers based on silver or on a metal alloy containing silver, and (n+1) coatings 20, 60, 100, 140, 180, with n being an integer greater than or equal to 2, said coatings being composed of a plurality of dielectric layers 24, 26; 62, 64, 66; 102, 104, 106, 142, 144, 146, 182, 184, so that each functional layer 40, 80, 120, 140 is placed between two coatings 20, 60, 100, 140, 180, at least two functional layers, and preferably each functional layer, being deposited on a wetting layer 30, 70, 110, 150 itself deposited directly on a subjacent coating 20, 60, 100, 140 respectively.

Thus, on the basis of the above single-functional-layer tests, several two-functional-layer tests were carried out, but were not all satisfactory.

Figure 5:
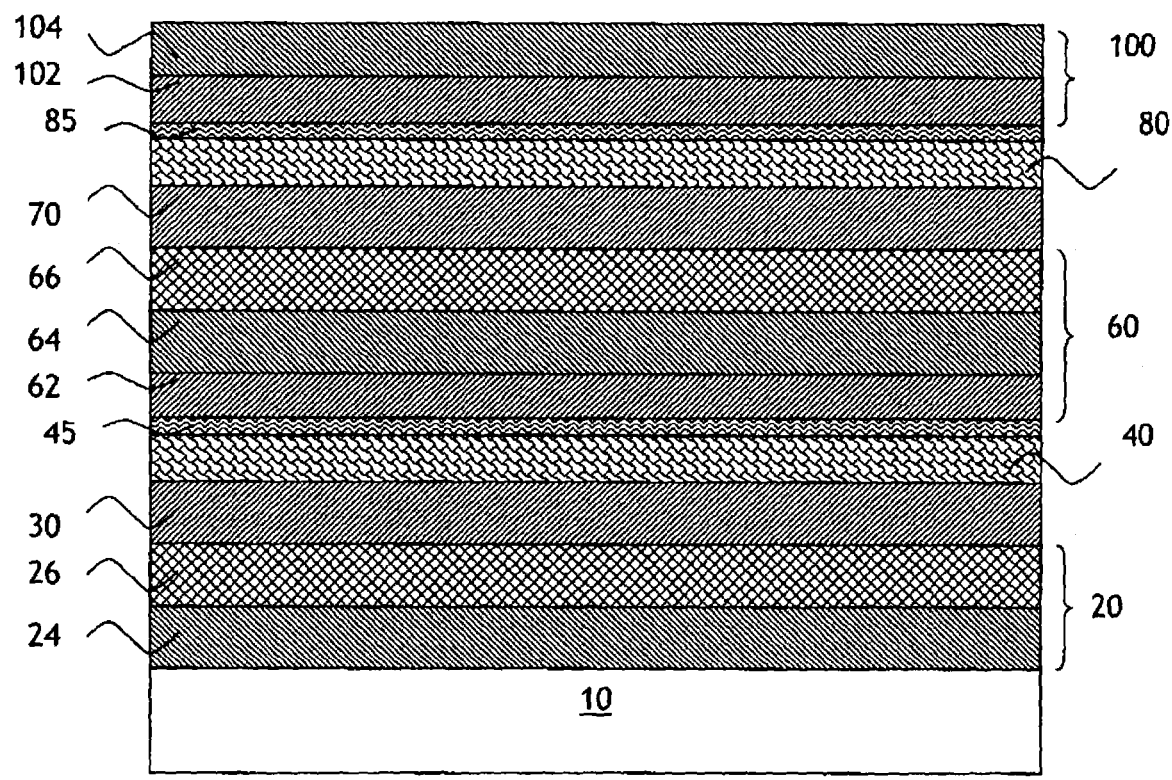
FIG. 5 illustrates a multilayer having two functional layers according to the invention, each functional layer being provided with an overblocking coating but not an underblocking coating.

Two examples, numbered 1 and 2, were produced based on the multilayer structure having two functional layers illustrated in FIG. 5, in which each functional layer 40, 80 is provided with an overblocking coating 45, 85, but not with underblocking coating.

Table 2 below illustrates the thicknesses in nanometers of each of the layers:

TABLE 2

| Layer | Material | Ex. 1 | Ex. 2 |
| --- | --- | --- | --- |
| 104 | $Si_3N_4$ | 20 | 20 |
| 102 | ZnO | 8 | 8 |
| 85 | Ti | 2 | 2 |
| 80 | $Ag_2$ | 10 | 10 |
| 70 | ZnO | 8 | 8 |
| 66 | $SnZnO_x$:Sb | 20 | 6 |
| 64 | $Si_3N_4$ | 40 | 52 |
| 62 | ZnO | 8 | 8 |
| 45 | Ti | 2 | 2 |
| 40 | $Ag_1$ | 10 | 10 |
| 30 | ZnO | 8 | 8 |
| 26 | $SnZnO_x$:Sb | 6 | 20 |
| 24 | $Si_3N_4$ | 20 | 6 |

Thus, in example 1 according to the invention, the thickness of the smoothing layer 26 based on antimony-doped zinc tin oxide $SnZnO_x$:Sb of the less thick subjacent coating 20 is less than the thickness of the smoothing layer 66 based on antimony-doped zinc tin oxide $SnZnO_x$:Sb of the thicker subjacent coating 60, whereas in the counterexample 2, the thickness of the smoothing layer 26 of the less thick subjacent coating 20 is greater than the thickness of the smoothing layer 66 of the thicker subjacent coating 60.

The resistivities obtained are given in Table 3 below:

TABLE 3

| | | Ex. 1 | Ex. 2 |
| --- | --- | --- | --- |
| Before heat treatment | R $Ag_2$ | 4.80 | 5.4 |
| | R $Ag_1$ | 4.75 | 4.5 |
| | R Total | 2.39 | 2.45 |
| After heat treatment | R $Ag_2$ | 3.73 | 4.35 |
| | R $Ag_1$ | 3.65 | 3.45 |
| | R Total | 1.84 | 1.92 |

Thus, the resistivity of example 1 according to the invention is better than that of example 2 both before heat treatment and after heat treatment.

In the case of example 2, the integration of the smoothing layer in a multilayer having several functional layers makes it impossible to reach the desired improvement, which was obtained in the case of example 1, in the crystallization of the functional layers, even though (and this has been verified) the smoothing layer is amorphous and the wetting layer is crystalline.

Figure 6:
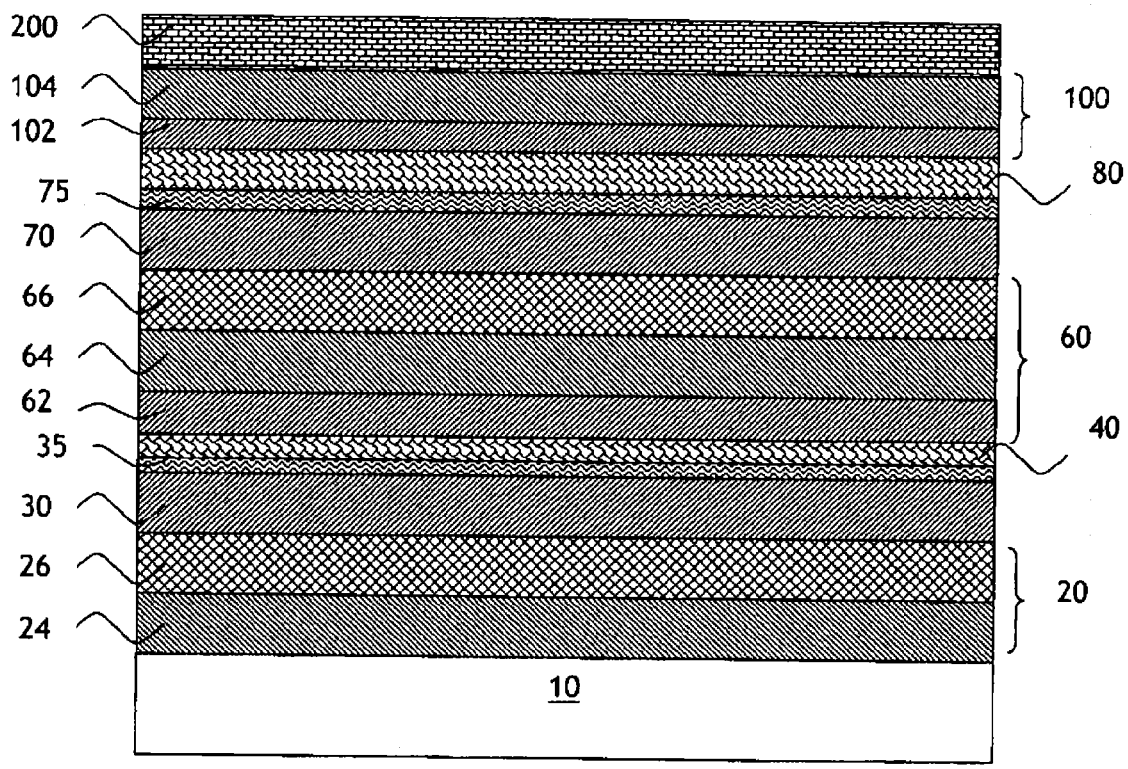
FIG. 6 illustrates a multilayer having two functional layers according to the invention, each functional layer being provided with an underblocking coating but not with an overblocking coating.

Another series of examples, numbered 3, was produced based on the multilayer structure having two functional layers illustrated in FIG. 6, in which each functional layer 40, 80 is provided with an underblocking coating 35, 75, without however the mechanical protection layer 200 seen in FIG. 6.

Table 4 below illustrates the thicknesses in nanometers of each of the layers:

TABLE 4

| Layer | Material | Ex. 3 |
| --- | --- | --- |
| 104 | $Si_3N_4$ | 27 |
| 102 | ZnO | 8 |
| 80 | $Ag_2$ | 10 |
| 75 | Ti | 2 |
| 70 | ZnO | 10 |
| 66 | $SnZnO_x$:Sb | Y |
| 64 | $Si_3N_4$ | 65-Y |
| 62 | ZnO | 8 |
| 40 | $Ag_1$ | 10 |
| 35 | Ti | 2 |

TABLE 4-continued

| Layer | Material | Ex. 3 |
|---|---|---|
| 30 | ZnO | 7 |
| 26 | SnZnO$_x$:Sb | X |
| 24 | Si$_3$N$_4$ | 23-X |

On this basis six examples, numbered 3a to 3f, were produced.

Table 5 below illustrates the X and Y values in nanometers of each example:

TABLE 5

| Ex. | type | X | Y |
|---|---|---|---|
| 3a | X < Y | 2 | 6 |
| 3b | X > Y | 6 | 2 |
| 3c | X < Y | 2 | 10 |
| 3d | X > Y | 10 | 2 |
| 3e | X < Y | 2 | 4 |
| 3f | X > Y | 4 | 2 |

Thus, in examples 3a, 3c and 3e according to the invention, the thickness of the smoothing layer 26 of the less thick subjacent coating 20 is less than the thickness of the smoothing layer 66 of the thicker subjacent coating 60, whereas in counterexamples 3b, 3d and 3f, the thickness of the smoothing layer 26 of the less thick subjacent coating 20 is greater than the thickness of the smoothing layer 66 of the thicker subjacent coating 60.

The resistivity, optical and energy characteristics of these examples are given in Table 6 below (the optical and energy characteristics were measured after annealing and insertion into laminated glazing having the structure: outside/2.1 mm glass substrate/0.25 mm PVB/2.1 mm glass substrate carrying the multilayer; the multilayer is thus found in surface 3, numbered relative to the direction of the incident sunlight):

TABLE 6

| Ex. | R$_\square$ (ohms) | T$_E$ | T$_L$(A) | a*(D$_{65}$) | b*(D$_{65}$) | R$_E$ | R$_L$ (D$_{65}$) |
|---|---|---|---|---|---|---|---|
| 3a | 2.7 | 45.02 | 77.25 | −2.36 | −5.75 | 33.40 | 11.29 |
| 3b | 2.9 | 44.58 | 75.30 | −4.88 | −4.64 | 32.70 | 13.08 |
| 3c | 2.6 | 45.46 | 78.31 | −1.98 | −4.78 | 33.36 | 10.96 |
| 3d | 2.8 | 45.21 | 77.33 | −2.81 | −4.38 | 33.08 | 11.79 |
| 3e | 2.8 | 44.96 | 77.49 | −3.02 | −4.51 | 33.43 | 11.42 |
| 3f | 2.9 | 45.12 | 77.81 | −1.79 | −4.72 | 33.64 | 11.19 |

Thus, the resistivity of the multilayer (measured here after heat treatment) of examples 3a, 3c, 3e according to the invention is still lower than the corresponding counterexamples 3b, 3d, 3f respectively.

Furthermore, the energy transmission T$_E$, the light transmission T$_L$ measured under illuminant A, the energy reflection R$_E$, the light reflection R$_L$ (D$_{65}$) measured under illuminant D$_{65}$ and the colors in reflection a* and b* in the LAB system measured under illuminant D$_{65}$ on the side of the layers do not vary very significantly between the examples according to the invention and the corresponding counterexamples 3b, 3d, 3f.

By comparing the optical and energy characteristics measured here before heat treatment with these same characteristics after heat treatment, no degradation was observed.

Figure 7:
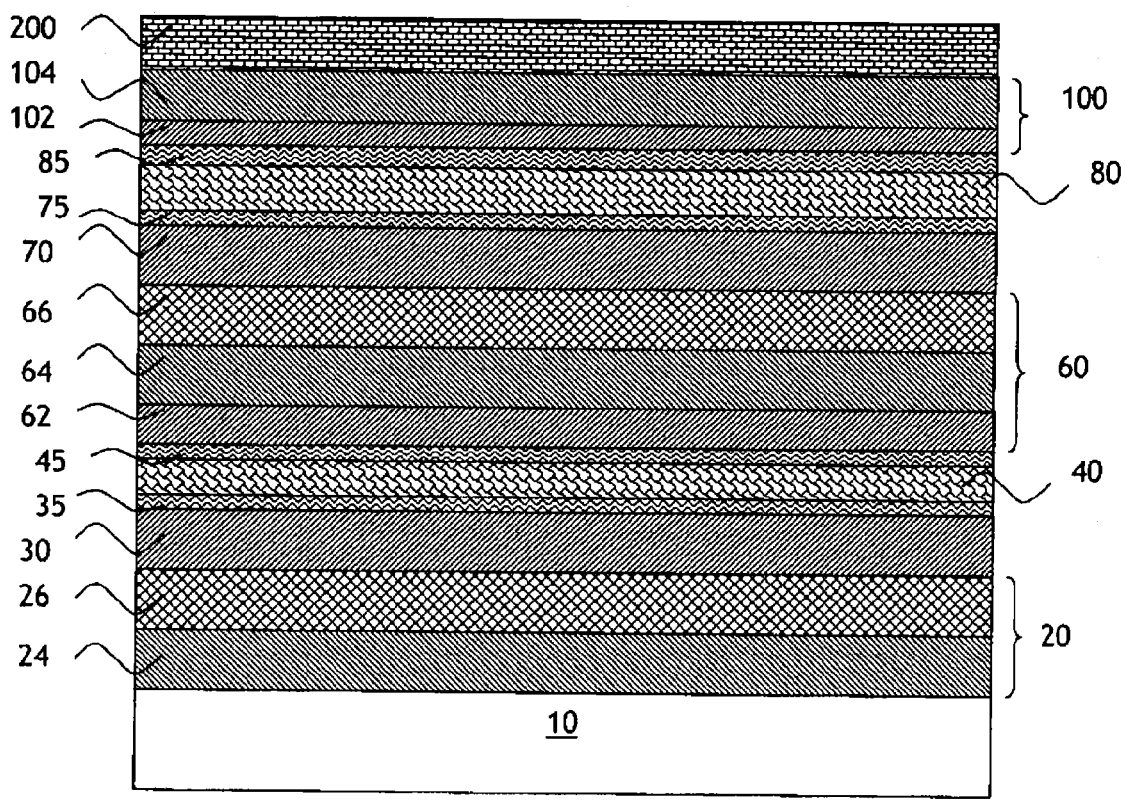
FIG. 7 illustrates a multilayer having two functional layers according to the invention, each functional layer being provided with an underblocking coating and with an overblocking coating.

Other tests were carried out based on the multilayer structure having two functional layers illustrated in FIG. 7, in which each functional layer 40, 80 is provided with an underblocking coating 35, 37 and with an overblocking coating 45, 85. These tests led to similar observations.

For structures having two functional layers, it was observed that it was preferable for the smoothing layer of the less thick subjacent coating to be closest to the substrate and consequently for the smoothing layer of the thicker subjacent coating to be furthest from the substrate.

Figure 8:
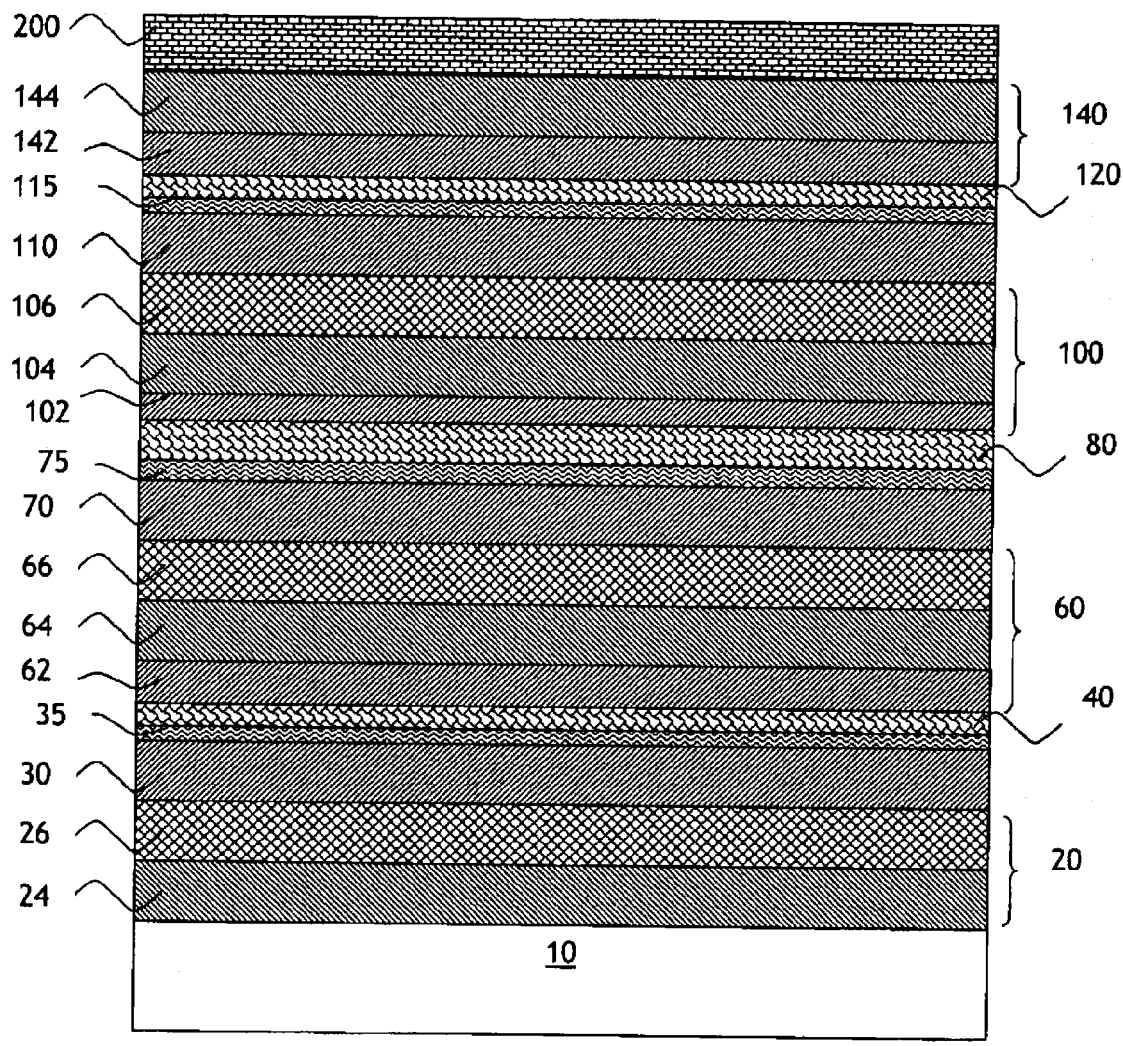
FIG. 8 illustrates a multilayer having three functional layers according to the invention, each functional layer being provided with an underblocking coating but not with an overblocking coating.

In addition, it is possible to apply the invention to a multilayer having three functional layers, such as for example the multilayer illustrated in FIG. 8.

In the configuration illustrated, each functional layer 40, 80, 120 is provided with an underblocking coating 35, 75, 115; however, it is also possible to provide, in addition to or without this underblocking coating 35, 75, 115, an overblocking coating.

Furthermore, in the configuration illustrated, each subjacent coating 20, 60, 100 comprises a smoothing layer 26, 66, 106 in accordance with the invention.

For the structures having three functional layers, it was observed that it was preferable for the smoothing layer of the less thick subjacent coating to be the closest to the substrate and for the smoothing layer of the thicker subjacent coating to be the central smoothing layer 66 and for the layer furthest from the substrate 106, to be thicker than the smoothing layer 26 closest to the substrate and less thick than the central smoothing layer 66.

In this structure, it is possible to provide only two smoothing layers, that is to say to provide only two subjacent coatings corresponding to the invention. In this case, the less thick coating of said two subjacent coatings is the furthest from the substrate.

Figure 9:
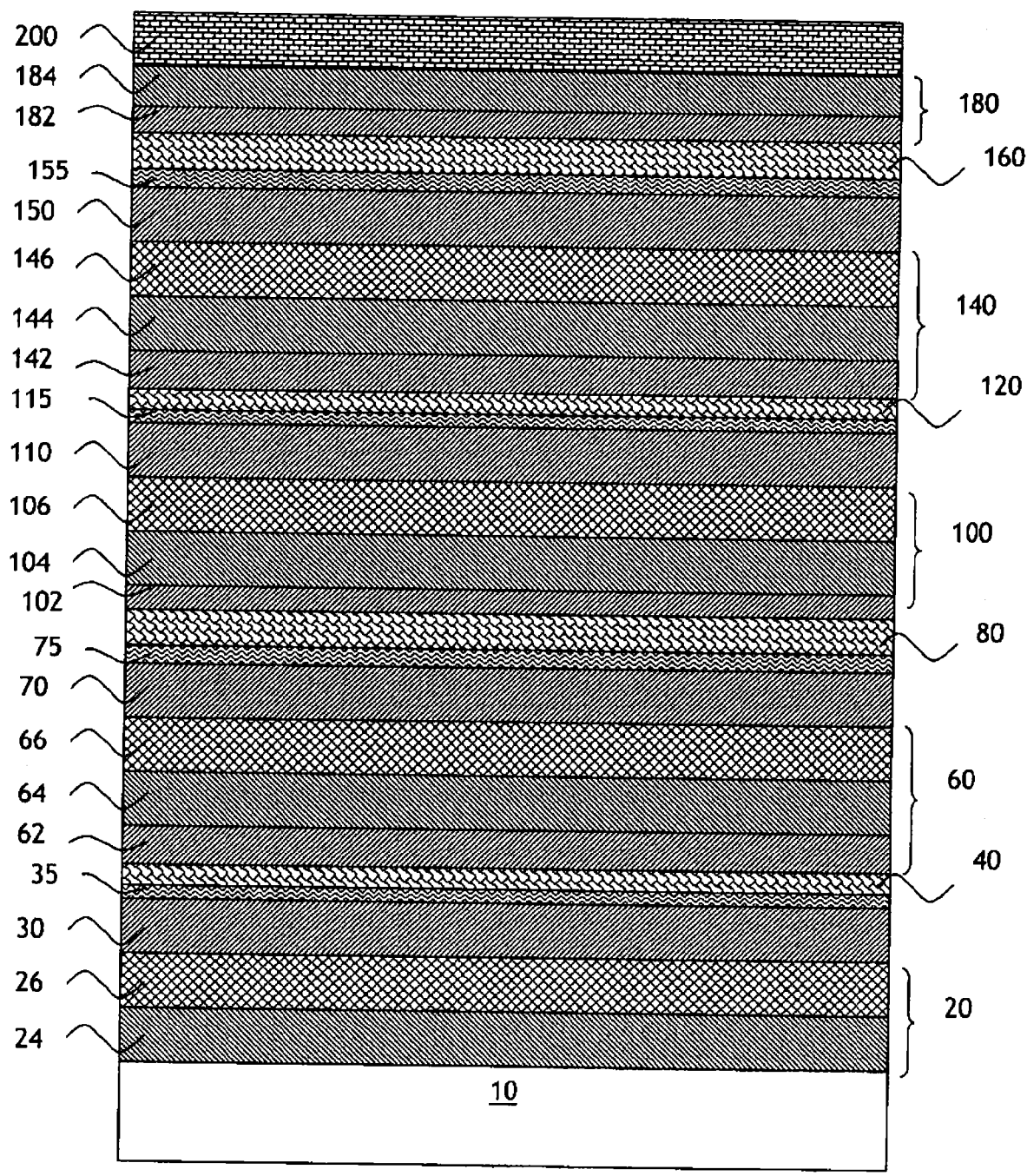
FIG. 9 illustrates a multilayer having four functional layers according to the invention, each functional layer being provided with an underblocking coating but not with an overblocking coating.

In addition, it is possible to apply the invention to a multilayer having four functional layers, such as for example the multilayer illustrated in FIG. 9.

In the configuration illustrated, each functional layer 40, 80, 120, 160 is provided with an underblocking coating 35, 75, 115, 155; however, it is also possible to provide, in addition to or without this underblocking coating 35, 75, 115, 155, an overblocking coating.

Furthermore, in the configuration illustrated, each subjacent coating 20, 60, 100, 140 comprises a smoothing layer 26, 66, 106, 146 in accordance with the invention.

This multilayer may be obtained, for example, by twice passing the substrate 10 into a device for depositing a multilayer having two functional layers, as is known from international patent Application WO 2005/051858, to deposit:

during a first pass, the layers 24 to 102, then during a second pass, the layers 104 to 182, then in a device for finishing the deposition, the layers 184 and 200.

In this structure, it is possible to provide only two smoothing layers, that is to say to provide only two subjacent coatings corresponding to the invention. In this case, the thinner coating of said two subjacent coatings is the furthest from the substrate.

The present invention has been described above by way of example. It will be understood that a person skilled in the art is capable of producing various alternative forms of the invention without thereby departing from the scope of the patent as defined by the claims.

The invention claimed is:

1. A substrate provided with a thin film multilayer comprising an alternation of n functional layers having reflection properties in the infrared and/or in solar radiation and (n+1) coatings, where n is an integer ≧2, said coatings being composed of a plurality of dielectric layers, so that each functional layer is placed between two coatings, at least two functional layers each being deposited on a wetting layer itself deposited respectively directly onto a subjacent coating, wherein two subjacent coatings each comprise at least one dielectric layer and at least one dielectric noncrystalline smoothing layer made from a material that is different from the material of said dielectric layer within each coating, said smoothing layer being in contact with said superjacent wetting layer and in that these two subjacent coatings being of different thicknesses, the smoothing layer of the thicker of the two subjacent coatings is at least as thick as the smoothing layer of the other subjacent coating, wherein all of the smoothing layers are an oxide layer or a mixed oxide layer based on an oxide of one or more of the following metals: Sn, Si, Ti, Zr, Hf, Zn, Ga, and In, wherein each wetting layer subjacent to a functional layer is based on zinc oxide, and wherein each dielectric layer adjacent to a smoothing layer within said subjacent coatings is based on silicon nitride and/or aluminum nitride.

2. The substrate as claimed in claim 1, wherein the multilayer comprises two functional layers alternating with three coatings.

3. The substrate as claimed in claim 1, wherein the multilayer comprises four functional layers alternating with five coatings.

4. The substrate as claimed in claim 1, wherein the subjacent coating closest to the substrate is the thinner coating of said two subjacent coatings.

5. The substrate as claimed in claim 1, wherein at least one smoothing layer up to all of the smoothing layers, is (or are) a mixed oxide layer or a layer of a mixed oxide based on zinc and tin or a layer of a mixed indium tin oxide (ITO) deposited at low temperature.

6. The substrate as claimed in claim 1, wherein the or each smoothing layer has a geometric thickness between 0.1 and 30 nm.

7. The substrate as claimed in claim 1, wherein in one and the same thin-film multilayer, all the subjacent coatings comprising a smoothing layer each comprise at least one dielectric layer and at least one dielectric noncrystalline smoothing layer made from a material that is different from the material of said dielectric layer within each coating.

8. The substrate as claimed in claim 1, wherein each functional layer is deposited on a wetting layer.

9. The substrate as claimed in claim 1, which has a light transmission of at least 75% or higher.

10. The substrate as claimed in claim 1, which has a light transmission of at least 40% or higher.

11. The substrate as claimed in claim 1, wherein the multilayer comprises three functional layers alternating with four coatings.

12. The substrate as claimed in claim 11, wherein the subjacent coating furthest from the substrate is the thinner coating of two adjacent subjacent coatings.

13. The substrate as claimed in claim 1, wherein at least one or each functional layer is placed directly onto at least one subjacent blocking coating and/or directly under at least one superjacent blocking layer.

14. The substrate as claimed in claim 13, wherein at least one blocking coating is based on Ni or on Ti or is based on an Ni based alloy.

15. A glazing unit, comprising at least one substrate as claimed in claim 1, optionally combined with at least one other substrate.

16. The glazing unit as claimed in claim 15, which is mounted in monolithic form or as multiple glazing wherein at least the substrate carrying the multilayer is curved or toughened.

17. The glazing unit as claimed in claim 15, further comprising an electric power supply to the multilayer.

18. A process for manufacturing the substrate as claimed in claim 1, the method comprising depositing the thin film multilayer on the substrate by a vacuum sputtering technique, optionally magnetron sputtering, and then heat treating the substrate and thin film multilayer to bend, toughen or anneal said substrate without degrading its optical and/or mechanical quality.

* * * * *